April 23, 1963  E. P. BULLARD III  3,086,493
INDICATING DEVICE
Filed Feb. 3, 1960  2 Sheets-Sheet 1
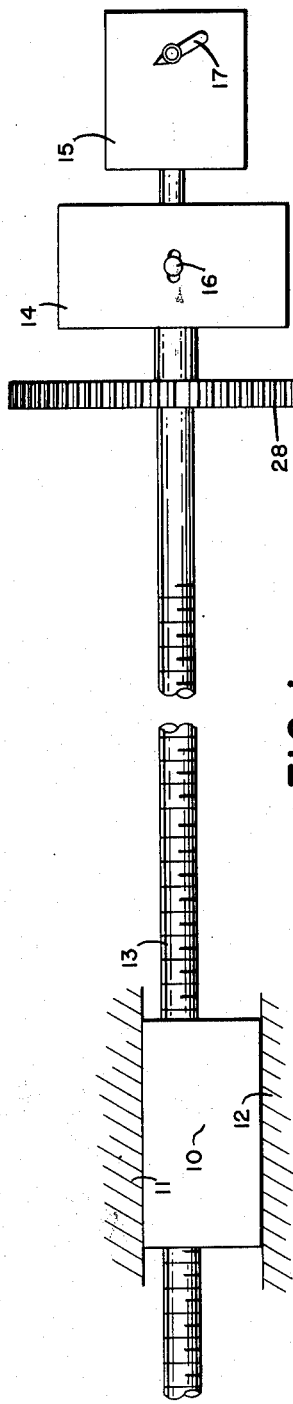
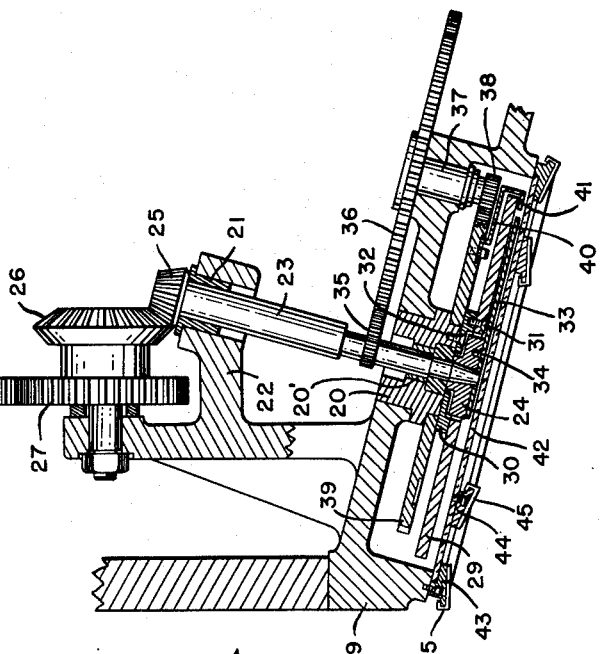
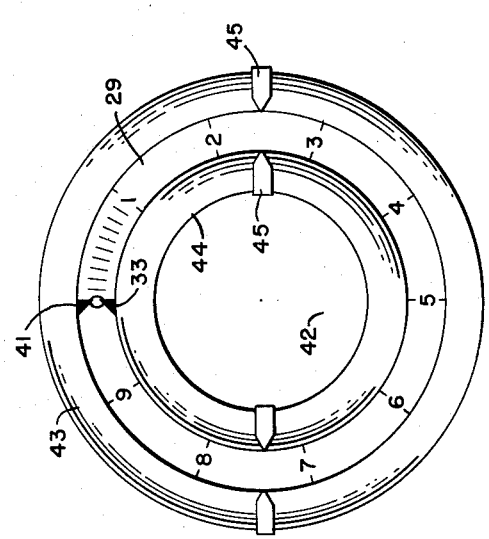
INVENTOR.
EDWARD P. BULLARD III
ATTORNEY April 23, 1963     E. P. BULLARD III     3,086,493
INDICATING DEVICE
Filed Feb. 3, 1960     2 Sheets-Sheet 2
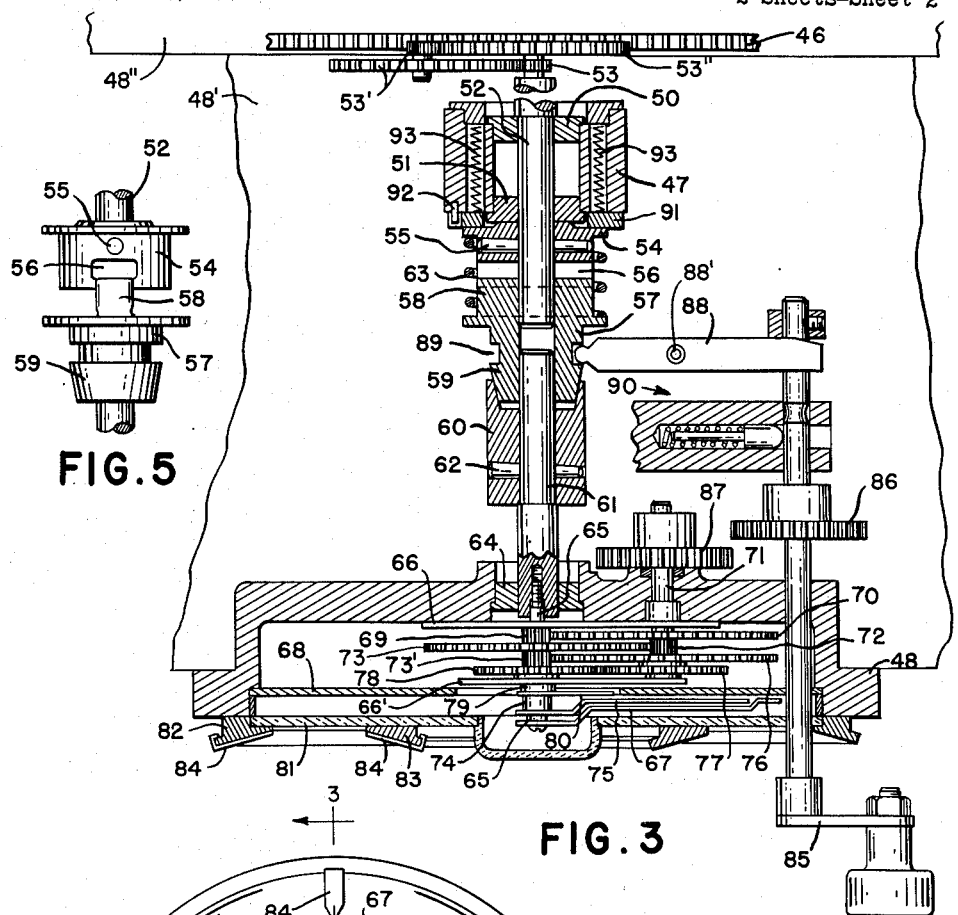
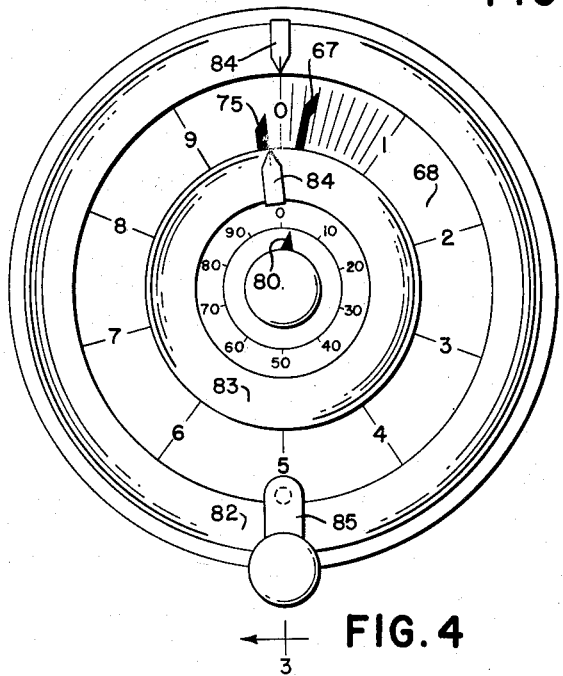
INVENTOR.
EDWARD P. BULLARD III
BY Paul M. Rist
ATTORNEY

United States Patent Office 3,086,493
Patented Apr. 23, 1963

3,086,493
INDICATING DEVICE
Edward P. Bullard III, Fairfield, Conn., assignor to The Bullard Company, a corporation of Connecticut
Filed Feb. 3, 1960, Ser. No. 6,549
2 Claims. (Cl. 116—124)

The present invention relates to measuring devices and particularly to a new and improved visual readout device for indicating to within .001 of a unit of measure, the position from a datum of a linearly movable member along a path of travel.

The principal object of the invention is to provide an accurate, inexpensive visual readout device for machine tools and the like.

Another object of the invention is to provide such an accurate readout device in which linear motions of as small as .001 of a unit of measure can be visually detected at a substantial distance from the device.

Still another object of the invention is to provide such an accurate readout device in which removable clips may be employed to facilitate the repetitive reading thereof.

Another object of the invention is to provide such a readout device in which five significant digits are visually perceptible at a substantial distance from the device.

Another object of the invention is to provide such a readout device including presettable datum means.

In one aspect of the invention, a linearly movable member of a machine tool such as a tool supporting head may have fixed to it a nut threaded onto a rotatable screw that can be rotated in opposite directions at different rates of rotation. A stationarily mounted bracket may include a dial having a face of sufficient diameter and equally spaced divisions thereon that each division is readily visible at a substantial distance from the dial. By way of example only, there may be one hundred equally spaced divisions about a circle of, say, four inches in diameter, in which case the distance between divisions would be approximately ⅛ of an inch.

In another aspect of the invention, two rotatable pointers may be mounted for rotation about the dial face, the first of which may be driven by a gear train between it and the rotatable screw, and depending upon the pitch and type of screw, so that it makes five revolutions for one revolution of the screw. Thus, if the pitch and type of screw are such as to provide one-half unit of measure of movement of the linearly movable member per revolution of the screw, one revolution of the first pointer will be equal to .100 unit of measure of linear movement of the member. Since there may be one hundred divisions on the dial face at about ⅛" spacing, each division relatively to the first hand would represent .001 of a unit of measure of movement of the linearly movable member.

In another aspect of the invention, the second hand that rotates about the dial face may be geared down from the first hand in a ratio of 100:1, so that each revolution of the second mentioned hand would represent ten units of measure of movement of the linearly movable member, and each division on the dial face relatively to the second mentioned hand would represent .100 unit of measure of movement.

In still another aspect of the invention, adjustable clips may be attached to annular rings about the dial face arranged to cooperate with the divisions thereon, so that repetitive settings of the linearly movable member may be accomplished with ease. The mechanism described is particularly adaptable for lathes where the tool head movement is seldom more than thirty units of measure of travel and where the operator will know within which ten unit portions of the head movement he is operating.

In such machine tools as horizontal boring mills and the like, the movement of the linearly movable member may be as much as one hundred units or more. In still another aspect of the invention, a third hand may be provided on the dial face, and it may be geared down from the second hand by a gear ratio of 10:1 so that one revolution of the third hand would represent one hundred units of measure of movement, and each of the one hundred divisions on the dial face relatively to the third pointer would represent one unit of measure of movement.

In still another aspect of the invention, a resetting mechanism may be provided for setting the pointers to zero when a different datum is to be employed from which measurements are to be made.

The above, other objects and novel features of the invention will become apparent from the following specification and accompanying drawing which is merely exemplary.

In the drawing:

FIG. 1 is a sectional view, with parts broken away, of a portion of a machine tool showing indicating mechanism to which the principles of the invention have been applied;

FIG. 2 is a front view of the dial of the indicator shown in FIG. 1;

FIG. 3 is a sectional view taken substantially along line 3—3 of FIG. 4 of a modified form of the invention;

FIG. 4 is a front view of the dial shown in FIG. 3; and

FIG. 5 is a detail of the clutch drive shown in FIG. 3.

Referring to the drawings, and particularly to FIGS. 1 and 2, the principles of the invention are shown as applied to a linearly movable member 10 of a machine tool, the accurate linear movement of which is desired to be indicated to the nearest .001". The member 10 is guided along a rectilinear path of travel by ways 11 and 12, and includes a non-rotatable nut (not shown) that is threaded onto a rotatable screw 13. The screw 13 is connected to a reversing gear 14 and thence to a variable speed transmission 15. The reversing gear 14 may be similar to that shown at 23, 24, 25, 27; and the variable speed transmission may be similar to that shown at 29–47 of the patent to R. D. Bullard et al., 2,575,792. A lever 16 is employed to cause the screw 13 to rotate in opposite directions by movement to either side of a neutral position to thereby cause the member 10 to move in opposite directions along ways 11 and 12. One or more levers 17 is employed to vary the rate of rotation of screw 13.

In the embodiment disclosed in FIG. 1, the screw 13 will be described as a double thread, quarter inch pitch so that for each revolution of the screw, member 10 moves linearly one half inch. A stationarily mounted bracket 18 includes an angularly disposed housing 19 in which is mounted a stationary sleeve 20 supporting a plain bearing 20' aligned with a plain bearing 21 that is mounted in an arm 22. A shaft 23 is journaled in the bearings 20' and 21, and a hub 24 is fixed to its one end while a bevel pinion 25 is fixed to its opposite end. A bevel gear 26 meshing with pinion 25 has fixed to it a spur gear 27 that meshes with a spur gear 28 fixed to the screw 13. In the embodiment disclosed in FIG. 1, the number of teeth on gears 28, 27, 26 and 25 are 84, 42, 35 and 14, respectively, so that one revolution of screw 13 will provide $$\frac{84}{42} \times \frac{35}{14}$$

or five revolutions of shaft 23.

Referring to FIG. 2, a dial 29 is fixed to a disc 30 by screws 31, and the disc 30 is fixed to the stationary sleeve 20 by screws 32. The dial 29, as shown in FIG. 2, has ten equally spaced major divisions, and each of the major divisions is divided into ten equally spaced divisions so that there are one hundred divisions about the dial 29. In order that each division is easily discernible at a substantial distance from the dial, the outside diameter of the dial 29 is large enough to provide, say, approximately 1/8 of an inch between each division. A pointer 33 is fixed to the hub 24 by screws 34, and since it makes five revolutions for each revolution of the screw 13, which latter moves the head 10 exactly one-half inch, then one revolution of pointer 33 will correspond to 1/5 of one-half inch, or 1/10 of an inch of movement of head 10. Accordingly, since there are one hundred divisions about dial 29, each division will represent .001".

Referring again to FIG. 1, a gear 35 fixed to shaft 23 meshes with spur gear 36 that is fixed to a back shaft 37. The gears 35 and 36 provide a 10:1 step-down ratio between shafts 23 and 37. A gear 38 also is fixed to shaft 37, and it meshes with a gear 39 journaled on the stationary sleeve 20. The gears 38 and 39 provide a 10:1 step-down ratio between shaft 37 and gear 39. A pointer arm 40 is fixed to gear 39 and includes a portion that extennds outwardly over and inwardly of the dial 29, terminating in a pointer 41. Since the step-down ratio between shaft 23 and gear 39 is 100:1, each division on dial 29 relatively to pointer 41 will correspond to 1/10 of an inch, and the major divisions about dial 29 will represent inches.

A transparent face 42 is fixed to housing 19, and annular rings 43 and 44 are attached to said face exteriorly and interiorly of the divisions about dial 29. Adjustable clips 45 are employed with the annular rings 43 and 44 to facilitate repetitive measurements in a known manner.

Referring to FIGS. 3 and 4, the principles of the invention are shown as applied to an indicator for use with horizontal boring mills and the like. A bearing mount 47 is fixed to a housing 48 by means not shown. The housing 48 is mounted in a spindle head 48' that is adapted to be propelled in either direction along a column 48" of a horizontal boring mill. Bearing mount 47 supports spaced aligned bearings 50 and 51 that journal a shaft 52. The shaft 52 has a spur gear 53 fixed to it that meshes with gears 53' and 53" in a step-up gear ratio, and gear 53" meshes with a rack 46 that is stationarily mounted on the column 48". Accordingly, as the spindle head and mount 47 move linearly along column 48", gear 53 causes shaft 52 to rotate in a direction depending upon the direction of linear movement of the spindle head 48'.

A coupling member 54 is fixed to shaft 52 by a pin 55, and it includes a diametrical slot 56 (FIG. 5) extending across its one face. Another coupling member 57 includes a diametrical tongue 58 adapted to lie at all times within slot 56, although relative movement between coupling members 54 and 57 along the axis of shaft 52 will occur as will be described. The end of coupling member 57 opposite that containing tongue 58 is provided with a clutch element 59 adapted to cooperate with a mating clutch element 60. The clutch element 60 is fixed to a shaft 61 by a pin 62. The coupling members 54 and 57 are resiliently urged away from each other by a spring 63 to effect engagement of clutch elements 59 and 60. The end of shaft 61 opposite that extending into clutch element 59 is journaled in a bearing 64 within the housing 48. A shaft 65 is axially mounted in the end of shaft 61 and it is journaled in bearings within plates 66 and 66' mounted within housing 48. The outermost end of shaft 65 has a pointer arm 67 fixed to it.

In the embodiment disclosed, the gear ratio between gears 53" and 53' is 6:1, and that between gears 53' and 53 is 6:1. Furthermore, the pitch circle of gear 53" is 3.6". Accordingly, for each revolution of gear 53' the spindle head moves 3.6" linearly and shaft 52 with pointer arm 67 moves through thirty six revolutions. Accordingly, one revolution of the arm 67 will represent .100" of linear movement of the spindle head.

Referring to FIG. 4, a dial face 68 is mounted within housing 48, and it includes one hundred divisions about its face such that each is easily discernible at a substantial distance from the dial. Accordingly, each division on dial 68 will represent .001" of linear movement of the spindle head.

Referring again to FIG. 3, shaft 65 has fixed to it a spur gear 69 that meshes with a gear 70 that is fixed to a shaft 71 journaled in bearings in plates 66 and 66'. There is a 10:1 step-down gear ratio between gears 69 and 70. Gear 70 has fixed to it a gear 72 that meshes with a gear 73 in a 10:1 step-down ratio. The gear 73 is fixed to a sleeve 74 that is journaled on shaft 65. A pointer arm 75 is fixed to the sleeve 74. From the foregoing, it is evident that the pointer arm 75 makes one revolution while pointer arm 67 makes one hundred revolutions. Accordingly, one revolution of pointer arm 75 corresponds to ten inches of linear movement of the spindle head.

Referring again to FIG. 3, gear 73 has a small spur gear 73' fixed to it that meshes with a gear 76 in a 10:1 step-down ratio, which latter is journaled on shaft 71. Gear 76 is fixed to a gear 77 that meshes in a 1:1 ratio with a gear 78. The gear 78 is fixed to a sleeve 79 that is journaled on sleeve 74, annd a pointer arm 80 is fixed to sleeve 79. From the foregoing it is evident that pointer arm 80 makes one revolution for each ten revolutions of pointer arm 75 and one thousand revolutions of pointer arm 67.

A transparent face 81 may cover the front of the housing 48, and annular rings 82 and 83 are located exteriorly and interiorly, respectively, of the dial 68. Adjustable clips 84 are attached to the annular rings for facilitating repetitive indications.

In machine tools such as horizontal boring mills, it often becomes desirable to employ a changeable datum from which measurements are to be made. In the embodiment shown in FIG. 3, this has been accomplished by providing a crank 85 having a gear 86 fixed to it which meshes with a gear 87 fixed to shaft 71. Normally the gears 86 and 87 are not in mesh, but upon moving the crank axially they may be meshed, whereupon turning crank 85 will reset the pointers 67, 75 and 80 to any desired point about the dial 68. When this is done, the clutch element 59 must be disengaged from element 60. Accordingly, a lever 88 pivoted at 88' has its one end riding in a groove 89 of clutch element 59 and its other end connected to the shaft supporting crank 85 and gear 86. A spring pressed detent 90 is employed to releasably maintain crank 85 in position such that gears 86 and 87 are in mesh. When the crank is forced inwardly beyond the control of the detent 90, spring 63 will effect engagement of the clutch elements 59 and 60.

In order to provide a slight drag on the drive from the rack 46 through the gears 53, 53' annd 53", a bronze ring 91 is located between the end of bearing mount 47 and the coupling member 54. The ring 91 is held against rotation by a pin 92 that extends from mount 47 into a slot within ring 91, and springs 93 urge ring 91 into engagement with the one end of coupling member 54.

Although the various features of the new and improved indicating device have been shown and described in detail to fully disclose two embodiments of the invention, it will be evident that changes may be made in such details and certain features may be used without others without departing from the principles of the invention.

What is claimed is:
1. In a machine tool, a column; a rack stationarily mounted on said column; a head member mounted for linear movement along said column; an indicator mounted in said head member and including two axially aligned shafts; a coupling between said shafts; step-up gearing between said rack and said axially aligned shafts; a pointer fixed to said shafts for rotation by said step-up gearing such that a single revolution of said pointer represents one-tenth of a unit of linear movement of said head member; a 100:1 gear reduction between said shafts and a member mounted for rotation about the axis of said shafts; a pointer connected to said rotatable member; a 10:1 gear reduction between said rotatable member and another member mounted for rotation about the axis of said shafts; and a pointer connected to said other rotatable member.

2. In a machine tool as claimed in claim 1, wherein said coupling comprises a clutch adapted to engage and disengage said axially aligned shafts; a crank adapted to be moved between two positions effecting the engagement and disengagement of said clutch; and gearing between said step-down gearing and said crank adapted to be moved into meshing relation when said clutch is disengaged and to be moved out of meshing relation when said clutch is engaged.

References Cited in the file of this patent

UNITED STATES PATENTS

| | | |
|---|---|---|
| 470,373 | De Sloovere | Mar. 8, 1892 |
| 2,069,627 | Schwarzhaupt | Feb. 2, 1937 |
| 2,881,527 | Walters | Apr. 14, 1959 |

FOREIGN PATENTS

| | | |
|---|---|---|
| 529,405 | Italy | Jan. 22, 1955 |